LEONARD & GOBAR.
Subsoil Plow.
No. 80,356.            Patented July 28, 1868.
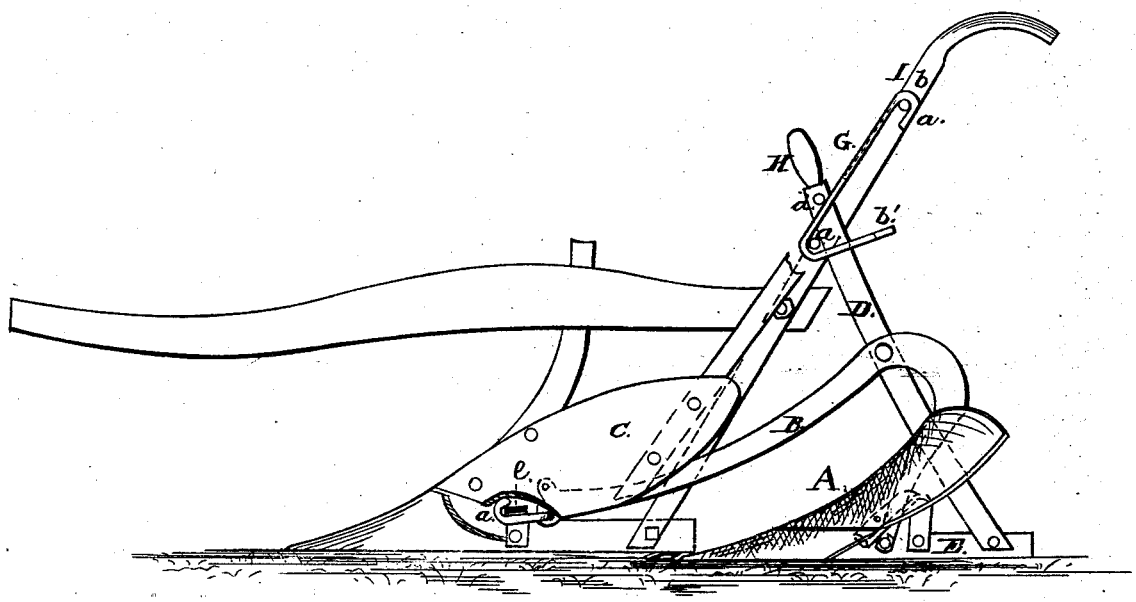

UNITED STATES PATENT OFFICE.

J. C. LEONARD AND J. J. GOBAR, OF CLINTON, MISSOURI.

IMPROVED SUBSOIL ATTACHMENT FOR PLOWS.

Specification forming part of Letters Patent No. 80,356, dated July 28, 1868.

*To all whom it may concern:*

Be it known that we, J. C. LEONARD and J. J. GOBAR, of Clinton, in the county of Henry and State of Missouri, have invented a new and useful Improvement in Subsoil Attachments for Plows; and we do hereby declare that the following is a full, clear, and exact description thereof, which will enable others skilled in the art to make and use the same, reference being had to the accompanying drawing, forming part of this specification, in which—

The drawing represents a perspective view of our invention.

Similar letters of reference indicate corresponding parts.

Our invention consists of an auxiliary plow so constructed as to be attached in rear of a common sod or other plow. In the accompanying drawing this auxiliary plow is shown attached to an ordinary plow by a hook-link caught upon a cross-bar from the landside to the share, and under the latter.

A is the subsoil-plow, having an iron swanneck beam, B, the free end of which is provided with a link or hook, $a$, catching upon the cross-bar $e$, under the share of the front plow C. A standard, D, rises from the landside E of the subsoil-plow, and its upper end has a free vertical movement in a slotted plate, G, fixed to the rounds $a\ a$ of the handles I of the front plow. The plate G is formed with bent ends $b\ b'$, clasping upon the rounds $a\ a$, as shown. The part $b'$ is slotted like the part G, and the standard D passes through both slots, which thus serve to guide the standard and keep the plow A erect. The standard is provided with a handle, H, by which the subsoil-plow is lifted over a root or other obstruction which it encounters. A pin, $d$, passing through the standard and across and above the plate G, serves to retain the plow A at the proper height. In plowing, the plow A follows in the furrow made by the plow C, and throws up a furrow of subsoil upon the sod-furrow made by the first plow, thus keeping the operation of breaking up the ground or sod-plowing, and at the same time subsoiling the land.

This plow attachment is capable of being attached to most of the plows now in use without altering the form or function of the same.

Having thus described our invention, we claim as new and desire to secure by Letters Patent—

The subsoil-plow A, constructed substantially as described, in combination with the sod or other plow C, all as set orth.

J. C. LEONARD.
J. J. GOBAR.

Witnesses:
JAS. M. AVERY,
ANGUS C. AVERY.